(12) United States Patent
Falconer et al.

(10) Patent No.: US 10,026,001 B2
(45) Date of Patent: Jul. 17, 2018

(54) SYSTEMS AND METHODS FOR MAPPING

(71) Applicant: Intel Corporation, Santa Clara, CA (US)

(72) Inventors: Maynard C. Falconer, Portland, OR (US); Debabani Choudhury, Thousand Oaks, CA (US); Reza Arefi, Great Falls, VA (US); Daniel J. Dahle, Wilsonville, OR (US); Denver H. Dash, Pittsburgh, PA (US); Vallabhajosyula S. Somayazulu, Portland, OR (US); Xingang Guo, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 776 days.

(21) Appl. No.: 14/036,212

(22) Filed: Sep. 25, 2013

(65) Prior Publication Data
US 2015/0086084 A1 Mar. 26, 2015

(51) Int. Cl.
*G06K 9/00* (2006.01)

(52) U.S. Cl.
CPC ..... *G06K 9/00979* (2013.01); *G06K 9/00664* (2013.01)

(58) Field of Classification Search
None
See application file for complete search history.

(56) References Cited

U.S. PATENT DOCUMENTS

| | | | | |
|---|---|---|---|---|
| 7,062,414 B2* | 6/2006 | Waite | | G01V 3/12 324/326 |
| 7,307,575 B2* | 12/2007 | Zemany | | G01S 13/32 342/160 |
| 7,626,400 B2* | 12/2009 | Holbrook | | G01S 13/89 324/642 |
| 8,253,619 B2* | 8/2012 | Holbrook | | H04N 1/107 324/323 |
| 8,411,086 B2* | 4/2013 | Rieffel | | G06T 17/00 345/419 |
| 8,593,157 B2* | 11/2013 | Adams | | G01R 27/04 324/244.1 |

(Continued)

OTHER PUBLICATIONS

Popescu et al., "The ModelCamera: a hand-held device for interactive modeling", 3DIM 2003.*

(Continued)

*Primary Examiner* — Soo Park

(57) ABSTRACT

Systems and methods to generate maps or models of structures are disclosed. Features of the structure to be mapped may be determined for the purposes of generating the map or model based at least in part on images associated with the structure, sensor measurements associated with the structure, and phase data of communications signals that interact with the structure. The mapping or modeling processes may be performed at a mapping server that receives images, sensor data, and/or communications signal phase information from one or more user devices, such as mobile devices. The mapping servers may perform a simultaneous localization and mapping (SLAM) process and may enhance the generated maps using sensor and/or communications phase data to map one or more hidden features of the structure.

22 Claims, 7 Drawing Sheets

(56) References Cited

U.S. PATENT DOCUMENTS

| | | | | |
|---|---|---|---|---|
| 8,965,741 B2* | 2/2015 | McCulloch | ............ | G06T 19/006 345/419 |
| 9,094,576 B1* | 7/2015 | Karakotsios | ............ | H04N 7/157 |
| 9,159,166 B2* | 10/2015 | Finn | ..................... | G01C 15/002 |
| 9,367,963 B2* | 6/2016 | Finn | ..................... | G01C 15/002 |
| 9,619,944 B2* | 4/2017 | Finn | ..................... | G01C 15/002 |
| 2004/0232329 A1* | 11/2004 | Biggs | ..................... | G01S 7/03 250/306 |
| 2010/0214284 A1* | 8/2010 | Rieffel | ..................... | G06T 17/00 345/419 |
| 2013/0282345 A1* | 10/2013 | McCulloch | ............ | G06T 19/006 703/6 |
| 2014/0210763 A1* | 7/2014 | Wells | ..................... | G06F 3/0412 345/174 |
| 2014/0210856 A1* | 7/2014 | Finn | ..................... | G01C 15/002 345/633 |

OTHER PUBLICATIONS

Ahmad et al., "Autofocusing of through-the-wall radar imagery under unknown wall characteristics", in IEEE Transactions on Image Processing, vol. 16, No. 7, pp. 1785-1795, Jul. 2007.*
Adams et al., "A handheld active millimeter wave camera", 2010 IEEE International Conference on Technologies for Homeland Security (HST), Waltham, MA, 2010, pp. 283-286.*

* cited by examiner

SYSTEMS AND METHODS FOR MAPPING

TECHNICAL FIELD

This disclosure generally relates to systems and methods for mapping.

BACKGROUND

Mapping information of buildings and other structures may be useful for a variety of purposes. For example, emergency personnel, such as firefighters or police officers, may want to know the internal structures of a building before entering the building. This may lead to increased effectiveness of the actions that the safety personnel may take within the building and, in some cases, may increase the safety of the emergency personnel within the building. Additionally, mapping information may be useful for commercial purposes, such as for commercial transactions involving buildings and/or other properties.

BRIEF DESCRIPTION OF THE FIGURES

Reference will now be made to the accompanying drawings, which are not necessarily drawn to scale, and wherein.

DETAILED DESCRIPTION OF EMBODIMENTS OF THE INVENTION

Figure 1:
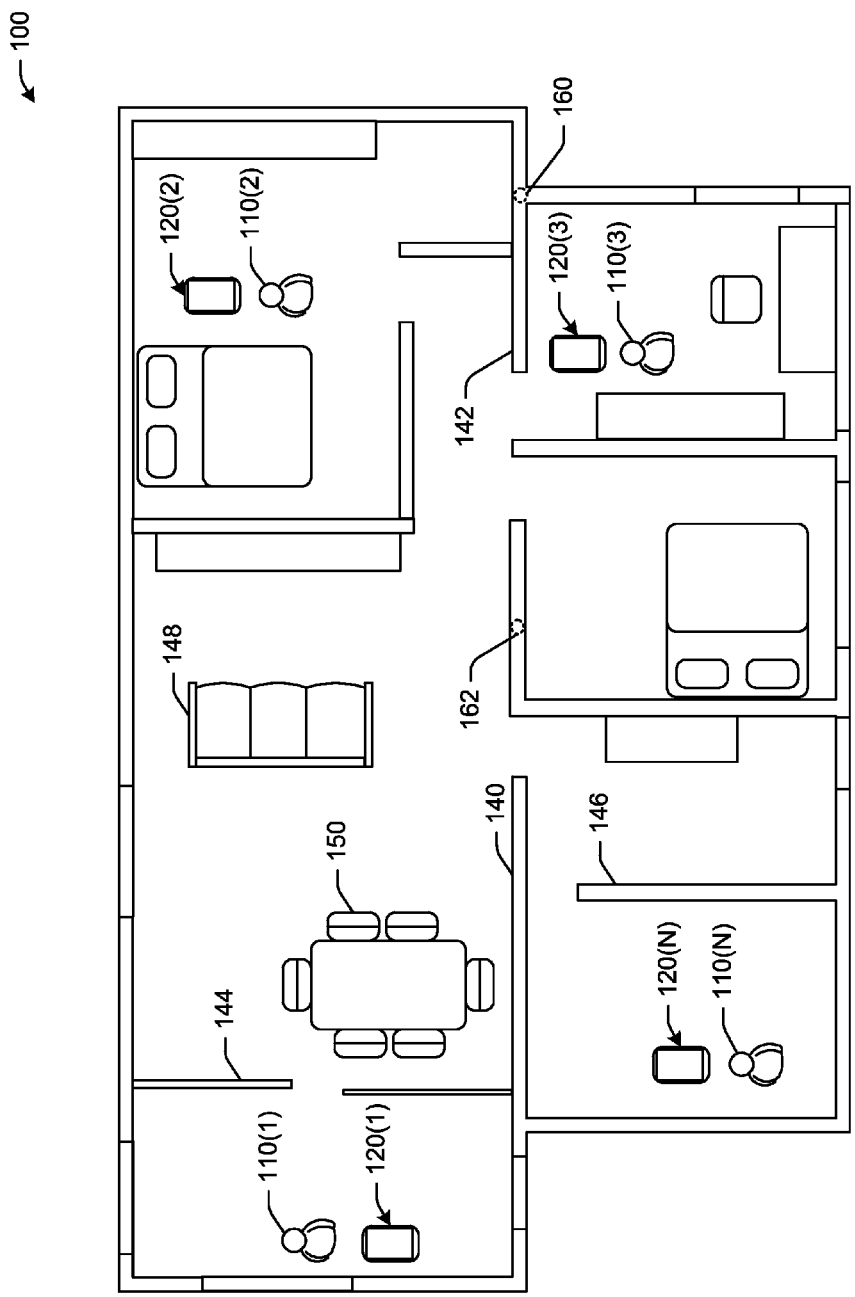
FIG. 1 is a simplified schematic diagram of an example floor plan of a building generated, in accordance with example embodiments of the disclosure.

Embodiments of the disclosure are described more fully hereinafter with reference to the accompanying drawings, in which example embodiments of the disclosure are shown. This disclosure may, however, be embodied in many different forms and should not be construed as limited to the example embodiments set forth herein; rather, these embodiments are provided so that this disclosure will be thorough and complete, and will fully convey the scope of the invention to those skilled in the art. Like numbers refer to like, but not necessarily the same or identical, elements throughout.

Embodiments of the disclosure may provide systems, apparatus, and methods for generating maps based at least in part on images, sensor information, and/or radio frequency (RF) communications phase information (IQ information) from a variety of sources. The maps may be of indoor structures, such as within a building, or of outdoor structures, such as the outside of a building or other landmarks. The maps may be, for example, a layout representation, a perspective representation, and/or a cross-sectional representation of the structure and/or features of the structure. The images, sensor information, and/or IQ information may be received, by one or more mapping servers, from one or more users via their user devices. These user devices may include a variety of personal devices such as communications devices that may include, for example, smart phones, tablet computing device, netbook computers, personal digital assistants, or the like.

The user devices may include an image sensor to capture images of buildings, walls, and/or other features that may be represented and/or used to generate one or more maps. The images generated by the image sensors of the user device may provide information related to features that may be visibly identified and/or located. In other words, these features may be on a surface and not hidden behind other features, such as a surface of a wall. The images captured by the image sensor of the user devices may generally be images of features that one may be able to see with their naked eyes. The images may contain spectral information in the visible wavelengths and possibly in the infrared and/or near-ultraviolet (near-UV) wavelengths. The images received from the user devices by the one or more mapping servers may be applied to a simultaneous localization and mapping (SLAM) process to both identify the locations associated with the received image and to incorporate the information of the image to generate and/or update a map of a location and/or structure with which the received image is associated.

In some example embodiments, the user devices may further have one or more sensors disposed thereon that may be used to provide sensor information to the mapping servers. These sensors may include a variety of suitable sensors, such as millimeter wave sensors, radio detection and ranging (RADAR), light detection and ranging (LIDAR), sound navigation and ranging (SONAR), or the like. The sensors of the user devices may include a transmitter along with a receiver for transmitting and/or receiving electromagnetic and/or sound waves for the purposes of detection of features of the structure to be mapped. In some cases, the sensor information may include location information, such as global navigation satellite system (GNSS) receiver information, inertial sensor, such as accelerometer-based information, and/or Wi-Fi access point (AP) based location information. Such location information may be used to pre-filter locations that may be associated with the received images, sensor information, and/or communications phase information (IQ data). The sensor information may be transmitted by the user devices and received by the mapping servers, along with the images, to enhance the maps generated by the mapping servers. In certain example embodiments, the sensor information may be used in the SLAM process to enhance or otherwise improve the precision and/or accuracy of the generated and/or updated maps.

The phase information associated with communications between a user device and communications infrastructure, such as a cellular telephone tower, may be received by the mapping server. This information may be received directly from the user device or, alternatively, from a communications server associated with the communications infrastructure. This information may be used to determine locations and information about hidden features of the mapped structure. For example, features that are not detectible with visible light wavelengths, such as with the image sensor, may be detected by the received phase information. These hidden features may be a variety of suitable features, such as water pipes, studs, poles, other load bearing construction elements, electrical wirings, communications wirings, other conduits, or the like. In certain example embodiments, the mapping server may receive information associated with phase differences between components of wireless communications signals as transmitted by the user devices and as received by the communications infrastructure or alternatively, as transmitted by the communication infrastructure and as received by the user device. For example, a phase shift may be detected in the in-phase component and/or the quadrature component of the wireless signal and this phase shift in the signal may be indicative of elements through which the communications signal traverses. In other words, as the a communications signal is received by a communications infrastructure, such as a cellular phone receiver/tower, the phase information from that communications signal may be determined and used to identify materials through which the communications signal passed. If the communications signal passed through hidden features of the structure to be mapped, then the hidden feature may be identified.

In certain example embodiments, the images, sensor information, and/or IQ information may be received from a plurality of user devices. In other words, the information used to generate the maps by the mapping servers may be crowd sourced. As additional information (image, sensor, and/or IQ) are received by the mapping servers, the maps generated by the mapping servers may be updated and refined. In some example cases, the refinement of the maps may lead to greater precision and/or accuracy of features on the map.

FIG. 1 is a simplified schematic diagram of an example floor plan 100 of a building generated, in accordance with example embodiments of the disclosure, in accordance with example embodiments of the disclosure. The floor plan 100 may be generated by images produced by one or more user(s) 110(1), 110(2), 110(3), . . . , 110(N) (hereinafter collectively or individually referred to as user 110) using their respective user devices 120(1), 120(2), 120(3), . . . , 120(N) (hereinafter collectively or individually referred to as user device 120).

The user device 120 may be any one of suitable devices that may be configured to execute one or more applications, software, and/or instructions to provide one or more images, sensor signals, and/or communications signals. The user device 120, as used herein, may be any variety of client devices, electronic devices, communications devices, and/or mobile devices. The user device 120 may include, but is not limited to, tablet computing devices, electronic book (ebook) readers, netbook computers, notebook computers, laptop computers, desktop computers, personal digital assistants (PDA), smart phones, web-enabled televisions, video game consoles, set top boxes (STB), or the like. While the drawings and/or specification may portray the electronic device 120 in the likeness of a smartphone, the disclosure is not limited to such. Indeed, the systems and methods described herein may apply to any electronic device 120 generating an image, sensor signal, and/or communication signal.

The layout 100, as generated by the system and methods herein, may include a variety of features, such as walls 140, 142, 144, 146 and/or furniture 148, 150. Furthermore, there may be hidden features, such as water pipes 160 and/or load bearing element 162. It will be appreciated that the layout 100 is representative of a particular type of map. According to example embodiments of the disclosure, other types of maps, such as a cross sectional map, a profile map, a three dimensional rendered map, or any other suitable type of map of the structure. The layout 100, or any other map type, may be generated by simultaneous localization an mapping (SLAM) process performed on images captured by the user devices 120 by the users 110. In certain example embodiments, images captured by the user devices may be provided to a mapping server where the SLAM process may be performed.

It will be appreciated that in some example embodiments, the images for generating the layout 100 may be generated by a single user device 120. For example, a user 110, such as a home owner may take pictures with his/her user device 120 so that a map of his/her house may be generated. In other example embodiments, the images for generating the layout 100 may be received from a plurality of user devices 120. For example, a number of users, such as visitors to a public building may provide images of the public building for the purposes of generating maps of the public building.

Figure 2:
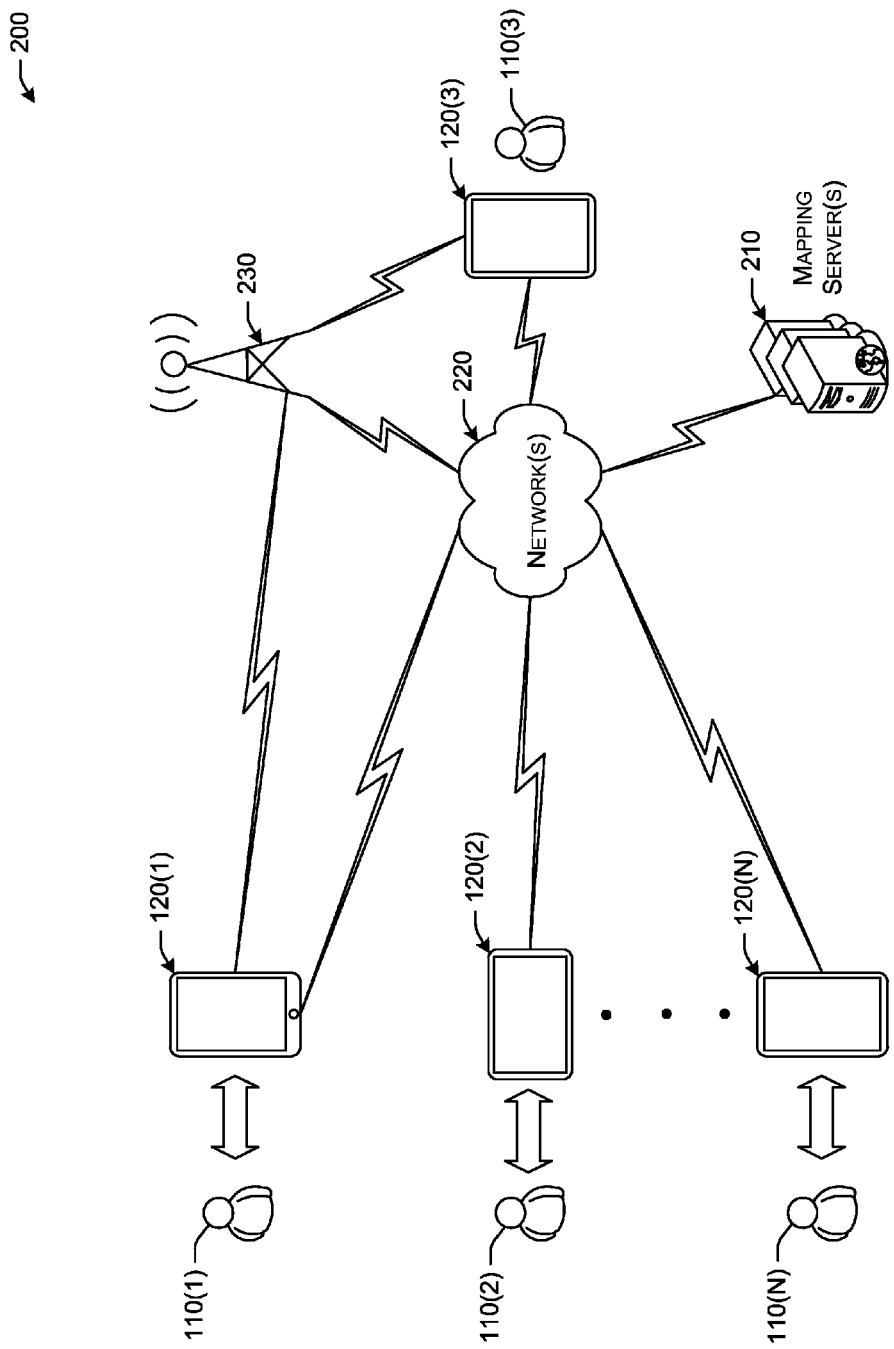
FIG. 2 is a simplified block diagram illustrating an example environment including mapping servers to generate maps, in accordance with example embodiments of the disclosure.

FIG. 2 is a simplified block diagram illustrating an example environment 200 including mapping servers 210 to generate maps, in accordance with example embodiments of the disclosure. As depicted in FIG. 2, the example environment 200 may include the user device 120 communicatively coupled to the mapping servers 210 via a network 220. The user devices 120 may further be communicatively coupled to communications infrastructure 230, such as a cellular communications tower/receiver. The mapping servers 210 are configured to receive one or more of images and/or sensor signals from the user devices 120. Based, at least in part, on the received images and/or sensor signals, the mapping servers 210 may be configured to perform the SLAM process. The SLAM process may entail determining the location where an image was captured with the user device 110 and then manipulate the image by a variety of image manipulation mechanisms and then stich the image with other images that are received from the same or relatively proximal locations.

The networks 210 may include any one or a combination of different types of suitable communications networks, such as cable networks, the Internet, wireless networks, cellular networks, and other private and/or public networks. Furthermore the networks 210 may include any variety of medium over which network traffic is carried including, but not limited to, coaxial cable, twisted wire pair, optical fiber, hybrid fiber coaxial (HFC), microwave terrestrial transceivers, radio frequency communications, satellite communications, or combinations thereof. It is also noted that the described techniques may apply in other client/server arrangements (e.g., set-top boxes, etc.), as well as in non-client/server arrangements (e.g., locally stored software applications, etc.).

The communications infrastructure 230 may be configured to communicate with other communications infrastructure and/or user devices 120 using any suitable communication formats and/or protocols including, but not limited to, Wi-Fi, direct Wi-Fi, Bluetooth, 3G mobile communication, 4G mobile communication, long-term evolution (LTE), WiMax, direct satellite communications, or combinations thereof. The communications infrastructure 230 may communicate with other communications infrastructure to receive and then retransmit information, such as data packets. The communications infrastructure 230 may configured to receive wireless communications signals from the user devices 120. These communications signals may be wireless signals that include transmitted phase information of the transmitted wireless signal from the user device 120 carried thereon. This transmitted phase information may be data that is identified by the user device 120 and coded on to and carried by the wireless signal that is received at the communications infrastructure 230. In certain example embodiments, the phase information of the transmitted signal may include phase information associated with an in-phase component (I) and a quadrature (Q) component of the transmitted communications signal. The phase information of the transmitted signal as encoded onto the wireless signal transmitted by the user device 120 and received by the communications infrastructure 230, may be used to ascertain hidden features within a structure to be mapped, as described further with reference to FIG. 3. The communications infrastructure 230 may further be configured to transmit communications signals to the user device 120. In some cases, transmitted phase information, as transmitted by the communications infrastructure 230 may be carried by the communications signal transmitted by the communications infrastructure 230. It should also be noted that in certain example embodiments, the transmitted communications signal may be generated by alternative transceiver implementations, including, for example, all-digital polar RF transceivers where the I and Q information may be mapped from the Cartesian coordinate system to polar (amplitude and phase) coordinate systems.

Figure 3:
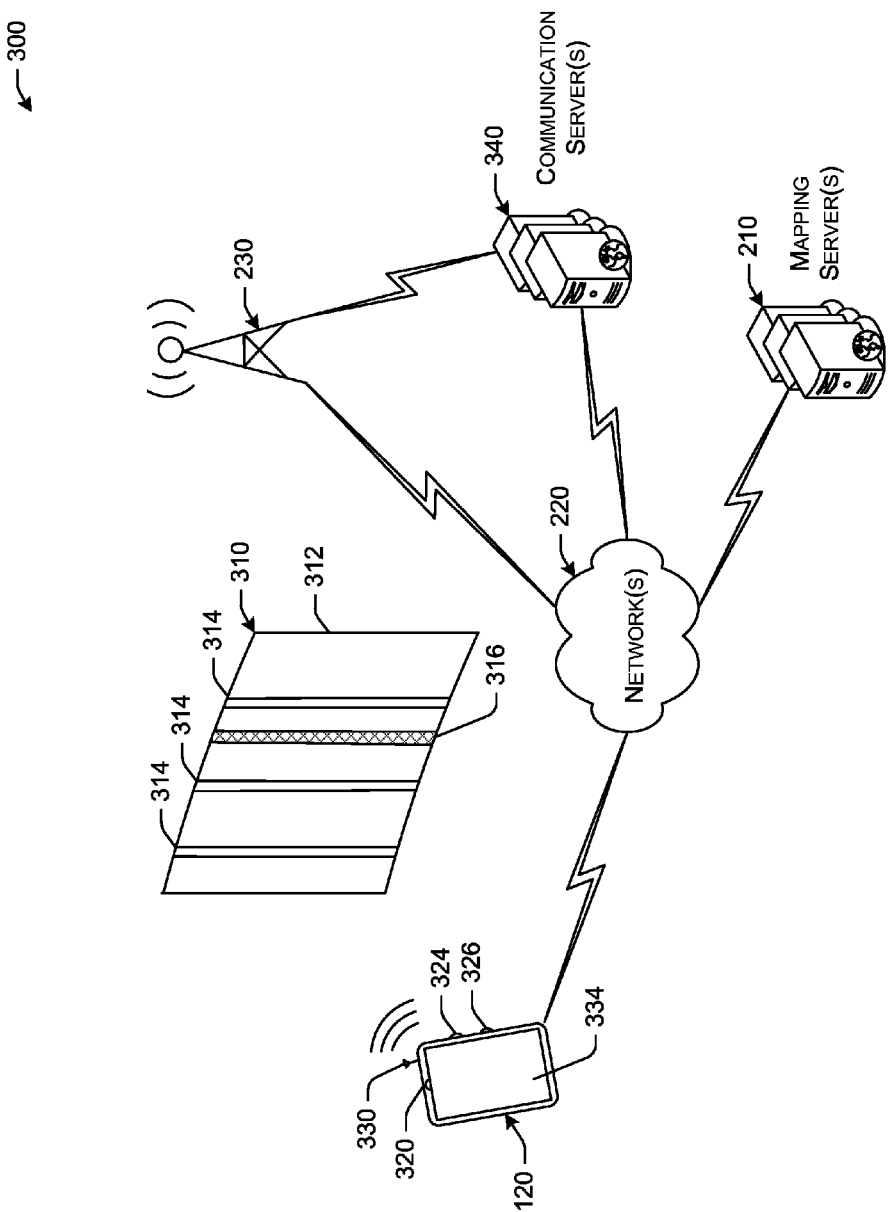
FIG. 3 is a simplified schematic diagram of an example environment including a structure with features that is mapped, in accordance with example embodiments of the disclosure.

FIG. 3 is a simplified schematic diagram of a use environment 300 with an example wall 310 of a building that is to be mapped, in accordance with example embodiments of the disclosure. The wall may include visible features, such as the surface 312 of the wall and/or hidden features, such as studs 314 or pipes 316. The visible features 312 may include a surface of drywall, sheetrock, veneer, wall paper, wall paint, or the like. Although specific hidden features are depicted, it will be appreciated that the wall may include any variety of hidden features including, but not limited to, water pipes, studs, poles, other load bearing construction elements, electrical wirings, communications wirings, other conduits, or combinations thereof. The hidden features 314, 316 may be hidden behind the visible features 312. For example, electrical conduits and plumbing may be hidden between drywall surfaces.

The user device 120 may further include an image sensor 320 or camera for imaging the visible features of the wall 310 and/or structure. The image sensor 320 may be any suitable image sensor for capturing images of the wall 310. The image sensor 320 may be any known device that captures at least a portion of light reflecting from or passing through one or more features of a structure and converts the captured light in to an electronic signal representative of an image of the one or more features of a structure. The image sensor 320 may be of any known variety including a charge coupled device (CCD), complementary metal oxide semiconductor (CMOS) sensors, or the like. The image sensor 320 may further be of any pixel count, aspect ratio, and refresh and/or capture rate.

The user device 120 may further include one or more sensors that may include a transmitter 324 and a receiver 326. The transmitter 324 may be configured to transmit any known signal including, but not limited to, electromagnetic waves and/or compression waves. The receiver may be configured to detect a signal provided by the transmitter 324, such as a signal that reflects off of a feature of the structure, such as the wall 310. In some example embodiments, the transmitter 324 and receiver 326 may be configured to detect visible features 312 of the wall 310. In some cases, the sensor in the form of the transmitter 324 and receiver 326 may be a range sensor that may be utilized to provide a distance to the visible feature 312 while capturing an image of the visible feature 312. Example range sensors may include associated transmitters 324 and receivers 326 for light detection and ranging (LIDAR), radio detection and ranging (RADAR), and/or sound navigation and ranging (SONAR). In other example embodiments, the transmitter 324 and receiver 326 may be configured to detect hidden features 314, 316 of the wall 310. Example sensors for detecting hidden features 314, 316 may include millimeter (mm) wave sensors with associated mm wave transmitters 324 and mm wave receivers 326. These mm wave transmitters 324 and receivers 326 may operate in the range of about 60 GHz to about 150 GHz. Other suitable sensors disposed on the user device may include global navigation satellite system (GNSS) receivers, such as global positioning satellite (GPS) receivers and/or accelerometers, such as microelectro-mechanical systems (MEMS) based accelerometers. This information from these sensors, in certain example embodiments, may be processed to provide location coordinates, such as latitude, longitude, and/or altitude coordinates derived from GNSS signals or a combination of GNSS signals and inertial sensors such as accelerometers.

The user device 120 may further include an antenna 330 for transmitting and/or receiving radio and/or wireless communications signals from one or more other user devices 120 and/or form the communications infrastructure 230. The antenna 330 may be any suitable type of antenna corresponding to the communications protocols used by the user device 120. Some non-limiting examples of suitable antennas 330 include Long Term Evolution (LTE), third generation (3G), fourth generation (4G), Wi-Fi antennas, IEEE 802.11 family of standards compatible antennas, directional antennas, non-directional antennas, dipole antennas, folded dipole antennas, patch antennas, multiple-input multiple-output (MIMO) antennas, or the like. The antenna 330 may be coupled to a radio to transmit and/or receive the communications signals to/from the antenna 330. In some example cases, the user device 120 may be configured to receive a communications signal from the communications infrastructure 230 that carries transmitted phase information from the communications infrastructure 230. The user device 120 may further be configured to identify the transmitted phase information from the communications infrastructure 230. This phase information may be used to ascertain a change in the phase of the communications signal from the point of transmission at the communications infrastructure 230 and at the point of receiving the communications signal at the user device 120. This change in phase of the communication signal may further be communicated from the user device 120 to the mapping servers 210 via the networks 220 or other suitable communications link.

The user device 120 may further have one or more user interfaces 334 disposed thereon. The user interfaces 334 may be in the form of a touch screen, microphone, accelerometer sensor, or any other suitable user interface 334 that may be used by a user 110 to interact with the user device 120. A user 110 may be able to interact with the user device 120 via the user interface 334 to initiate capturing an image of the structure 310, perform a sensor measurement of the structure 310, and/or initiate transmission of a communications signal to the communications infrastructure 230. In other words, the user 110 may be able to use the user interface 334 to enable the user device 120 to provide the images, sensor measurements, and/or IQ data for generation of maps of the structure 310.

The environment 300 may further include one or more communication server(s) 340 that may be communicatively coupled to the networks 220 or other suitable communicative links. The communications servers 340 may further be communicatively coupled to the communications infrastructure 230, either directly or indirectly, such as via the networks 220. The communications servers 340 may determine IQ data based on phase information determined at either or both of the communications infrastructure 230 and/or the communications servers 340. This IQ data may be, for example, the difference in the phase of the in-phase and quadrature components of the communications signal from transmission to receipt of the communications signal. The IQ data, therefore, may vary with the distance between the user device 120 from which the communications signal is transmitted and the communications infrastructure 230 and the material through which the communications signal travels. It should also be noted that in certain example embodiments, the transmitted communications signal may be generated by alternative transceiver implementations, including, for example, all-digital polar RF transceivers where the I and Q information may be mapped from the Cartesian coordinate system to polar (amplitude and phase) coordinate systems.

Figure 4:
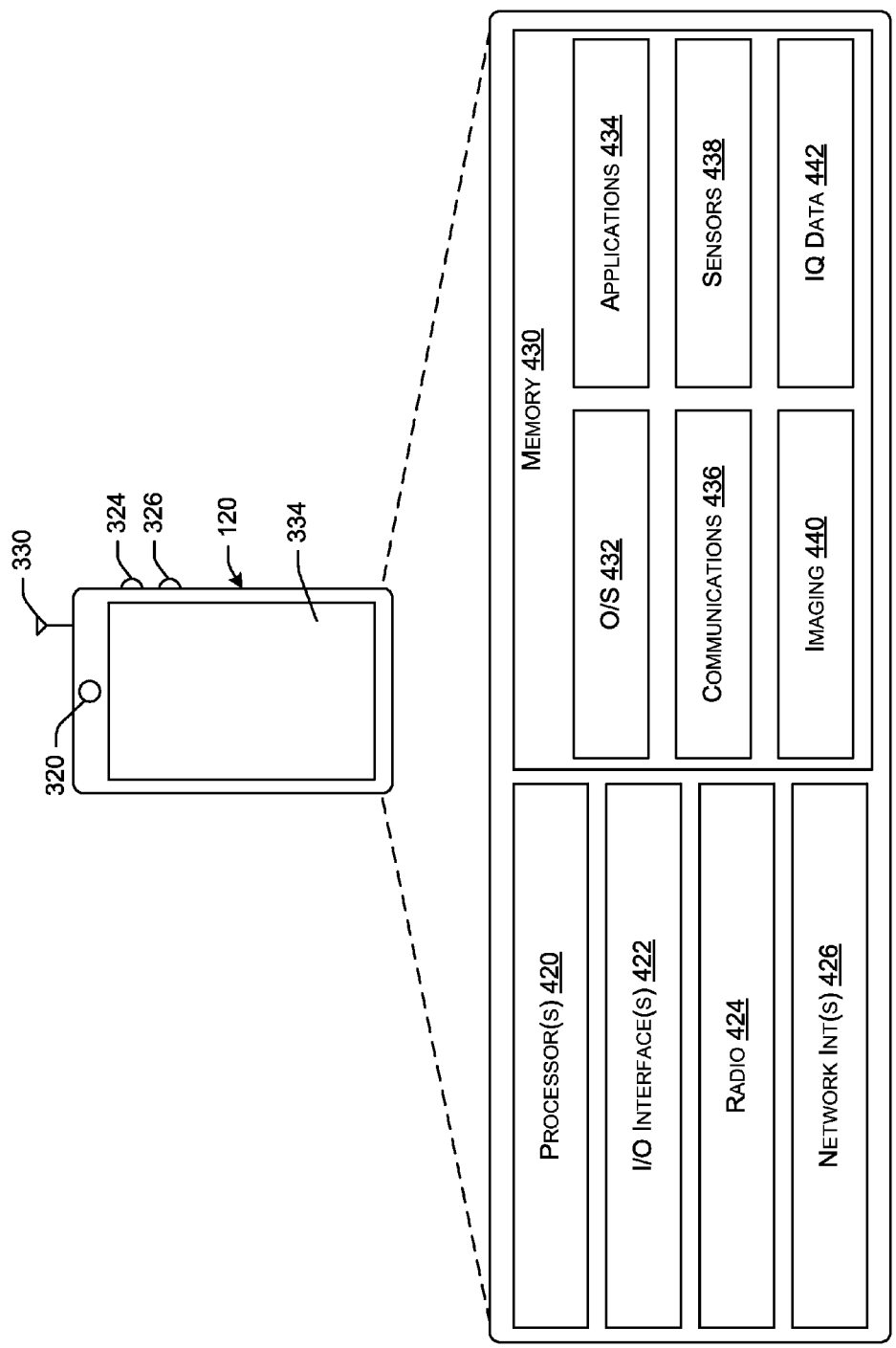
FIG. 4 is a simplified block diagram illustrating an example architecture of user devices that provide images and/or phase data for mapping, in accordance with example embodiments of the disclosure.

FIG. 4 is a simplified block diagram illustrating an example architecture of user devices 120 that provide images and/or phase data for mapping, in accordance with example embodiments of the disclosure. The user device 120 may include one or more processor(s) 420, input/output (I/O) interface(s) 422, a radio 424, network interface(s) 426, and memory 430.

The processors 420 of the user device 120 may be implemented as appropriate in hardware, software, firmware, or combinations thereof. Software or firmware implementations of the processors 420 may include computer-executable or machine-executable instructions written in any suitable programming language to perform the various functions described. Hardware implementations of the processors 420 may be configured to execute computer-executable or machine-executable instructions to perform the various functions described. In example embodiments, the processors 420 may be configured to execute instructions, software, and/or applications stored in the memory 430. The one or more processors 420 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The user device 120 may also include a chipset (not shown) for controlling communications between one or more processors 420 and one or more of the other components of the user device 120. The processors 420 may also include one or more application specific integrated circuits (ASICs) or application specific standard products (ASSPs) for handling specific data processing functions or tasks. In certain embodiments, the user device 120 may be based on an Intel® Architecture system and the one or more processors 420 and chipset may be from a family of Intel® processors and chipsets, such as the Intel® Atom® processor family.

The one or more I/O device interfaces 422 may enable the use of one or more (I/O) device(s) or user interface(s) 334, such as a touch sensitive screen, keyboard, and/or mouse. The user 110 may be able to administer images, sensor data, and communications phase information from the user device 120 by interacting with the user interfaces 334 via the I/O device interfaces 422. The network interfaces(s) 426 may allow the user devices 120 to communicate via the one or more network(s) 220 and/or via other suitable communicative channels. For example, the user device 120 may be configured to communicate with stored databases, other computing devices or servers, user terminals, or other devices on the networks 220.

The transmit/receive or radio 424 may include any suitable radio for transmitting and/or receiving radio frequency (RF) signals in the bandwidth and/or channels corresponding to the communications protocols utilized by the user device 120 to communicate with other user devices 120 and/or the communications infrastructure 230. The radio component 424 may include hardware and/or software to modulate communications signals according to pre-established transmission protocols. The radio component 424 may be configured to generate communications signals for one or more communications protocols including, but not limited to, Wi-Fi, direct Wi-Fi, Bluetooth, 3G mobile communication, 4G mobile communication, long-term evolution (LTE), WiMax, direct satellite communications, or combinations thereof. In alternative embodiments, protocols may be used for communications between relatively adjacent user device 120, such as Bluetooth, dedicated short-range communication (DSRC), or other packetized radio communications. The radio component 424 may include any known receiver and baseband suitable for communicating via the communications protocols of the user device 120. The radio component may further include a low noise amplifier (LNA), additional signal amplifiers, an analog-to-digital (A/D) converter, one or more buffers, and digital baseband. In certain embodiments, the communications signals generated by the radio 424 and transmitted via the antenna 330 may include an in-phase component (I) and a quadrature phase component (Q), where the in-phase component and the quadrature phase component is substantially orthogonal to each other. In other example embodiments, the transmitted communications signal may be generated by alternative transceiver implementations, including, for example, all-digital polar RF transceivers where the I and Q information may be mapped from the Cartesian coordinate system to polar (amplitude and phase) coordinate systems. The radio may further be configured to measure and encode phase information such as IQ phase data onto a transmitted signal from the user device 120. The phase information may be encoded on a periodic basis and may be encoded in a manner such that the communications infrastructure 230 and/or communications servers 340 may be able to decode and identify the IQ data as transmitted from the user device 120.

The memory 430 may include one or more volatile and/or non-volatile memory devices including, but not limited to, magnetic storage devices, read only memory (ROM), random access memory (RAM), dynamic RAM (DRAM), static RAM (SRAM), synchronous dynamic RAM (SDRAM), double data rate (DDR) SDRAM (DDR-SDRAM), RAMBUS DRAM (RDRAM), flash memory devices, electrically erasable programmable read only memory (EEPROM), non-volatile RAM (NVRAM), universal serial bus (USB) removable memory, or combinations thereof.

The memory 430 may store program instructions that are loadable and executable on the processor(s) 420, as well as data generated or received during the execution of these programs. The memory 430 may have stored thereon software modules including an operating system (O/S) module 432, applications module 434, communications module 436, sensors module 438, imaging module 440, and IQ data module 442. Each of the modules and/or software stored on the memory 430 may provide functionality for the user device 120, when executed by the processors 420.

The O/S module 432 may have one or more operating systems stored thereon. The processors 420 may be configured to access and execute one or more operating systems stored in the (O/S) module 432 to operate the system functions of the user device 120. System functions, as managed by the operating system may include memory management, processor resource management, driver management, application software management, system configuration, and the like. The operating system may be any variety of suitable operating systems including, but not limited to, Google® Android®, Microsoft® Windows®, Microsoft® Windows® Server®, Linux, Apple® OS-X®, or the like.

The application(s) module 434 may contain instructions and/or applications thereon that may be executed by the processors 420 to provide one or more functionality associated with the user device 120, including functions related to providing images, sensor data, and/or wireless communications signal phase information, as well as receiving mapping data and/or images for rendering to the user 110. These instructions and/or applications may, in certain aspects, interact with the (O/S) module 312 and/or other modules of the user device 120. The applications module 434 may have instructions, software, and/or code stored thereon that may be launched and/or executed by the processors 420 to execute one or more applications and functionality associated therewith. These applications may include, but are not limited to, functionality such as web browsing, business, communications, graphics, word processing, publishing, spreadsheets, databases, gaming, education, entertainment, media, project planning, engineering, drawing, or combinations thereof.

The communications module 436 may have instructions stored thereon that, when executed by the processors 420, enable the user device 120 to provide a variety of communications functionality. In one aspect, the processors 420, by executing instructions stored in the communications module 436, may be configured to demodulate and/or decode communications signals received by the user device 120 via the antenna 330 and radio 424. The processors 420 may further be configured to identify one or more phase information carried on the received communications signals from the communications infrastructure 230. The received communications signals may further carry audio, beacons data, handshaking, information, and/or other data thereon. In another aspect, the processors 420, by executing instructions form at least the communications module 436, may be configured to generate and transmit communications signals via the radio 424 and/or the antenna 330. The processors may encode and/or modulate communications signals to be transmitted by the user device 120. The processors may further encode phase based information, such as IQ data, onto the generated communications signals. In some cases this phase information may be periodically provided on the transmitted communications signal and may represent the phase at the time of transmission of an in-phase component of the communications signal and the phase at the time of transmission of the quadrature component of the communications signal.

The sensor module 438 may have instructions stored thereon that, when executed by the processors 420, enable the user device 120 to provide a variety of sensory functionality. In certain example embodiments, the processors 420, by executing instructions stored on the sensor module 438, may be configured to initiate a sensor transmitter 324 and receiver 326 to operate to generate sensor measurements. These measurements may further be interpreted by the processors 420 to generate sensor based information that may be provided to the mapping servers 210 to generate and/or enhance maps generated by the processes and systems discussed herein. In some example cases, the processors 420 may be configured to ascertain range information from LIDAR, SONAR, and/or RADAR type sensors. This range information in conjunction with corresponding images generated by the user device 120, such as via the image sensor 320, may enable determining the location of the images and/or manipulation that may be performed on the images by the mapping servers 210. In other cases, the sensor data measurement initiated by the processors 420, based at least in part by executing instructions stored in the sensor module 438, may include millimeter (mm) wave measurements. These measurement may provide information associated with the density of features of a structure to be measured. For example, the mm wave sensor measurements may be able to detect changes in density of various portions (e.g. depths) of a structure and thereby identify hidden features in the structure.

The sensors module 438 may further, in certain example embodiments, include instructions that, when executed by the processors 420, may configure the processors 420 to generate location information from one or more of GNSS signals and/or inertial sensors. Location information, as generated by the processors 420, when provided to the mapping servers 210, may enable reduced processing at the mapping servers in identifying locations associated with images for constructing maps and/or models of the structure. The location information may further provide the mapping servers 120 the ability to use identified phase differences in communications signals to determine changes in materials through which the communications signals pass. In some cases, the processors may be configured to provide location information, such as the absolute position and/or the relative position, of the user device 120 corresponding to the times when phase information is provided and/or encoded by the user device on a transmitted communications signal and/or identified by the user device 120 from a received communications signal. The location information, in some example cases, may be latitude, longitude, and/or altitude information ascertained from GNSS signals and a GNSS receiver of the user device 120. In other example cases, the location information may be relative location information that may be ascertained from a previously determined location by multi-axis accelerometers. For example, a change in position from a first location at a first time to a second location at a second time may be determined by manipulating accelerometer sensor output, such as by performing an algorithm including determining a double integral with respect to time of the accelerometer output for each of the multiple axis.

The imaging module 440 may have instructions stored thereon that, when executed by the processors 420, configure the user device 120 to provide a variety of imaging functions. In one aspect, the processors 420 may be configured to initiate capturing an image via the image sensor 320. In some example embodiments, the processors 420 may perform some preliminary image manipulation processes prior to transmitting the image to the mapping servers 210 via the networks 220. In some other example embodiments, the processors 420 may be configured to only transmit images that may be provide enhancements to the mapping of a particular structure.

The IQ data module 442 may have instructions stored thereon that, when executed by the processors 420, configure the user device 120 to provide a variety of functionality associated with interpreting and/or providing phase information associated with communications signals. In one aspect, the processors 420 may be configured to initiate an identification of the phase information associated with a transmitted wireless communications signal and encode that phase information onto the transmitted communications signal. This transmitted phase information may be encoded onto the wireless communications signal transmitted via the radio 424 and the antenna 330. The transmitted phase information may be determined on a periodic basis and transmitted by the user device 120. The processors 420 may be configured to transmit in-phase and quadrature phase information associated with wireless signals with in-phase and quadrature components that are substantially orthogonal to each other. In certain embodiments, location information associated with the user device, such as from GNSS signals and/or inertial sensors may also be transmitted on the communications signal along with the phase information. In some cases, IQ data along with absolute and/or relative location information may be used to determine a materials and/or distances through which the wireless communications signals travel to reach the communications infrastructure 230. In other words, a path length of the communications signal may be a function of both the distance and the materials through which the communications signal traverses. Accordingly, at the communications infrastructure 230, upon receiving the communications signal from the user device 120, the communications infrastructure and/or the communications server 340 may be configured to determine the difference in phase in the communications signal from when it was transmitted to when it was received at the communications infrastructure 230. This difference in phase between as-transmitted communications signal to the as-received communications signal may be provided to the mapping servers 210 by the communications infrastructure and/or the communications servers 340. It will be appreciated that based at least in part on the as-transmitted IQ data provided by the user device 120 and the processors 420 thereon, the communications infrastructure 230 and/or the communications servers 340 may be able to generate a time series of phase differences. Each measure of the phase difference of the time series of phase differences may correspond to a particular path length between the user device 120 and the communications infrastructure 230. If the user device moves around during the generation of the time series of the phase differences, then the time series of the phase differences may indicate changes in path length between the user device 120 and the communications infrastructure 230. The mechanism of utilizing the IQ data by the mapping servers 210 to ascertain aspects of hidden features is described further with reference to FIG. 5.

In another aspect, the IQ data module 442 may be configured to receive wireless signals at the user device 120 via the antenna 330 and radio 424 and process those wireless signals to determine transmitted phase information associated with the received wireless signal. The wireless signal may be received, in some example cases, from the communications infrastructure 230. The received communications signal may carry information related to the phase of the signal as transmitted, such as by the communications infrastructure 230. At the user device 120, the processors 420 may be configured to identify the as-transmitted phase (one or both of in-phase and/or quadrature) of the received signals based on the phase information coded thereon. The processors 420, in conjunction with the radio 424, may further be configured to determine the phase of the as-received communications signal. This may be performed by any suitable mechanism, such as techniques that may be used for maintaining phase coherence for purposes of demodulating received communications signals. As a non-limiting example, the received communications signal may be provided to a phase lock loop (PLL), such as a PLL of the radio component 424, to determine the phase. In some example cases, both the in-phase and the quadrature components of the received signal may be provided to the PLL for the determination of the phase of the received signal. In other example cases, it may be assumed that the phase difference between the in-phase and the quadrature components are substantially 90 degrees (pi/4 radians), and therefore, the phase of either the in-phase or the quadrature component may be determined.

Once the as-transmitted and the as-received phase of a communications signal is identified, a phase difference may be determined. The processors 420, by executing the instructions stored in the IQ data module 442, may further be configured to communicate the phase difference between the as-transmitted and the as-received communications signals from the user device 120 to the mapping server via the networks 220 or other suitable communications links. It should further be noted that the a time series of phase difference data may be generated at the user device 120 and the processors 420 thereon. In some example embodiments, this time series of phase difference data may be generated while the user device 120 is moving. In this case, the phase differences in the time series and, indeed the corresponding path lengths may vary with the location of the user device 120. In other example embodiments, the user device 120 may remain stationary and the time series of the phase differences may be substantially time invariant while the user device 120 is stationary. In some cases, the corresponding user device 120 location information, such as relative location, during the generation of the time series of phase difference information may be provided to the mapping servers 210. In other words, the user device 120 and the processors 420 thereon may transmit a series of phase difference information along with corresponding location information, such as absolute location information ascertained from GNSS signals and/or relative location information ascertained from inertial sensor (e.g. accelerometer) data.

It will be appreciated that there may be overlap in the functionality of the instructions stored in the operating system (O/S) module 432, the applications module 434, the communications module 436, the sensors module 438, the imaging module 440, and the IQ data module 442. In fact, the functions of the aforementioned modules 432, 434, 436, 438, 440, 442 may interact and cooperate seamlessly under the framework of the mapping servers 210. Indeed, each of the functions described for any of the modules 432, 434, 436, 438, 440, 442 may be stored in any module 432, 434, 436, 438, 440, 442 in accordance with certain embodiments of the disclosure. Further, in certain embodiments, there may be one single module that includes the instructions, programs, and/or applications described within the operating system (O/S) module 432, the applications module 434, the communications module 436, the sensors module 438, the imaging module 440, and the IQ data module 442.

Figure 5:
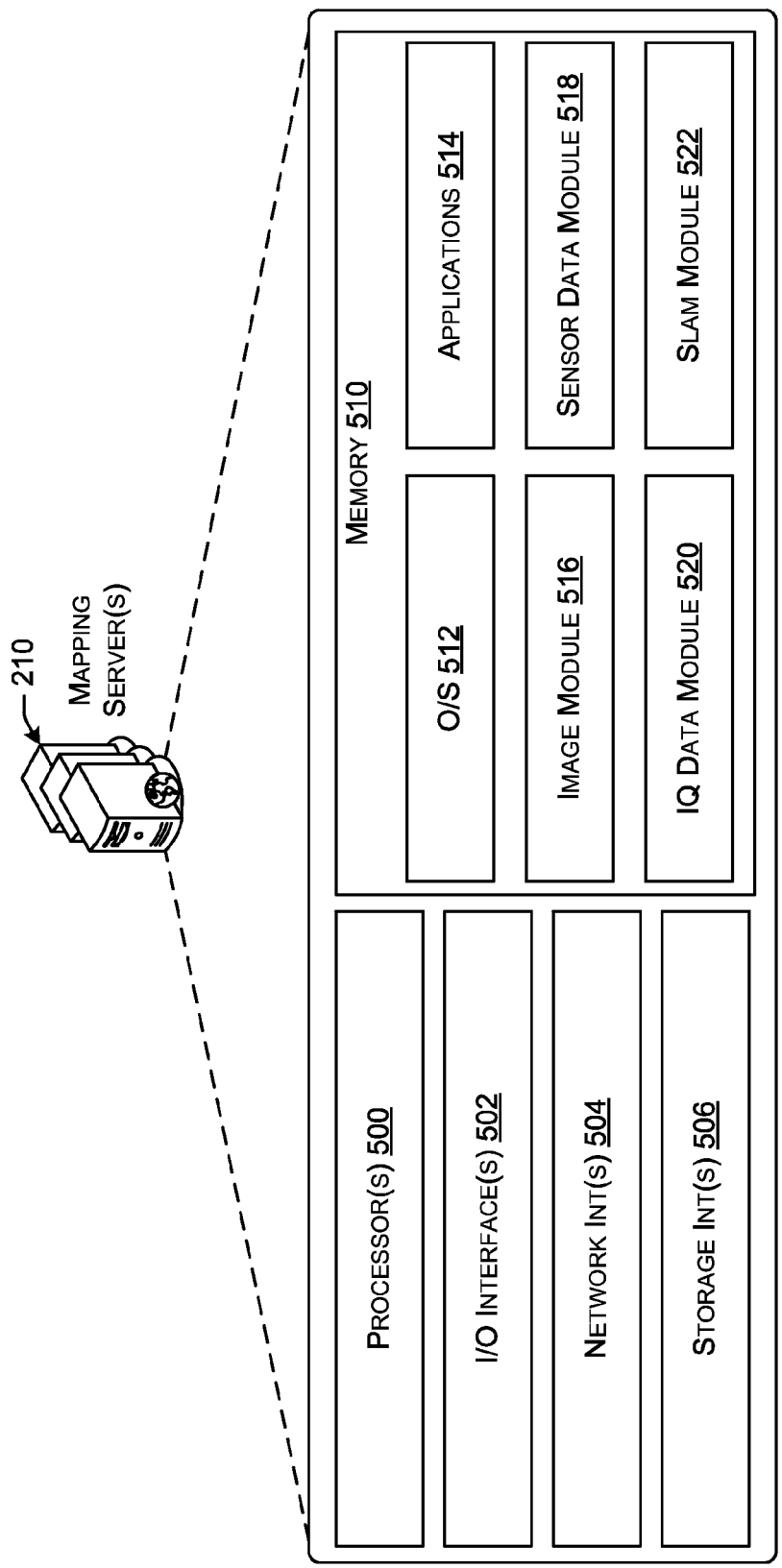
FIG. 5 is a simplified block diagram illustrating an example architecture of a mapping server, in accordance with example embodiments of the disclosure.

FIG. 5 is a simplified block diagram illustrating an example architecture of the mapping server 210, in accordance with example embodiments of the disclosure. The mapping server 210 may include one of more processors 500, I/O interface(s) 502, network interface(s) 504, storage interface(s) 506, and memory 510.

In some examples, the processors 500 of the mapping servers 210 may be implemented as appropriate in hardware, software, firmware, or combinations thereof. Software or firmware implementations of the processors 500 may include computer-executable or machine-executable instructions written in any suitable programming language to perform the various functions described. Hardware implementations of the processors 500 may be configured to execute computer-executable or machine-executable instructions to perform the various functions described. The one or more processors 500 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The mapping servers 210 may also include a chipset (not shown) for controlling communications between the one or more processors 500 and one or more of the other components of the mapping servers 210. The one or more processors 500 may also include one or more application specific integrated circuits (ASICs) or application specific standard products (ASSPs) for handling specific data processing functions or tasks. In certain embodiments, the mapping servers 210 may be based on an Intel® Architecture system and the one or more processors 500 and chipset may be from a family of Intel® processors and chipsets, such as the Intel® Atom® processor family.

The one or more I/O device interfaces 502 may enable the use of one or more (I/O) device(s) or user interface(s), such as a keyboard and/or mouse. The network interfaces(s) 504 may allow the mapping servers 210 to communicate via the one or more network(s) 220 and/or via other suitable communicative channels. For example, the mapping servers 210 may be configured to communicate with stored databases, other computing devices or servers, user terminals, or other devices on the networks 220. The storage interface(s) 506 may enable the mapping servers 210 to store information, such as images, sensor data, and/or communications signal phase/phase difference information in storage devices.

The memory 510 may include one or more volatile and/or non-volatile memory devices including, but not limited to, magnetic storage devices, read-only memory (ROM), random access memory (RAM), dynamic RAM (DRAM), static RAM (SRAM), synchronous dynamic RAM (SDRAM), double data rate (DDR) SDRAM (DDR-SDRAM), RAMBUS DRAM (RDRAM), flash memory devices, electrically erasable programmable read-only memory (EEPROM), non-volatile RAM (NVRAM), universal serial bus (USB) removable memory, or combinations thereof.

The memory 510 may store program instructions that are loadable and executable on the processor(s) 300, as well as data generated or received during the execution of these programs. Turning to the contents of the memory 510 in more detail, the memory 510 may include one or more operating systems (O/S) 512, an applications module 514, an image module 516, a sensor data module 518, an IQ data module 520, and/or a SLAM module 522. Each of the modules and/or software may provide functionality for the mapping servers 210, when executed by the processors 500. The modules and/or the software may or may not correspond to physical locations and/or addresses in memory 510. In other words, the contents of each of the modules 512, 514, 516, 518, 520, and 522 may not be segregated from each other and may, in fact be stored in at least partially interleaved positions on the memory 510.

The O/S module 512 may have one or more operating systems stored thereon. The processors 500 may be configured to access and execute one or more operating systems stored in the (O/S) module 312 to operate the system functions of the electronic device. System functions, as managed by the operating system may include memory management, processor resource management, driver management, application software management, system configuration, and the like. The operating system may be any variety of suitable operating systems including, but not limited to, Google® Android®, Microsoft® Windows®, Microsoft® Windows® Server®, Linux, Apple® OS-X®, or the like.

The application(s) module 514 may contain instructions and/or applications thereon that may be executed by the processors 500 to provide one or more functionality associated with generating maps and/or models associated with structures to be mapped. These instructions and/or applications may, in certain aspects, interact with the (O/S) module 512 and/or other modules of the mapping servers 210. The applications module 514 may have instructions, software, and/or code stored thereon that may be launched and/or executed by the processors 500 to execute one or more applications and functionality associated therewith. These applications may include, but are not limited to, functionality such as web browsing, business, communications, graphics, word processing, publishing, spreadsheets, databases, gaming, education, entertainment, media, project planning, engineering, drawing, or combinations thereof.

The image module 516 may have instructions stored thereon that, when executed by the processors 500, enable the mapping servers 210 to provide a variety of imaging management and/or image processing related functionality. In one aspect, the processors 500 may be configured to receive one or more images from one or more user devices 120 via the networks 220 or other suitable communicative links. These images may be stored on the memory 510 and/or other suitable database(s). The images may further be analyzed by the processors 500 by executing instructions stored in the image module 516 and/or the SLAM module 522. In certain embodiments, the processors 500 may be configured to identify one or more features associated with a structure that is common to two or more images received by the mapping servers 210 from the one or more user devices 120. In some example cases, images depicting a particular feature may be received from a single user device 120, such as in a time progression. In other example case, images depicting the particular feature may be received from a plurality of user devices 120. The processes enabled by the instructions included in the image module, therefore, may interact with the processes enabled by the instructions included in the SLAM module 522 to identify received images that may of relatively proximate locations, such as locations associated with the same structure and/or features.

The localization of the images received by the mapping server 210 may enable the processors 500 in the piecing together images to model and/or map the structure associated with the images. The localization process may involve analyzing individual pixels and/or clusters of pixels of the received images. For example, a first cluster of pixels that may be indicative of the light reflecting off of a particular feature and captured in a first image may be compared to a second cluster of pixels that may be indicative of light reflecting off of the same particular feature in a second image may be compared by the processors 500. The comparison may involve a variety of suitable algorithms and, in certain example embodiments, may result in a probability of a match of the feature in the first cluster of pixels in the first image and the second cluster of pixels in the second image. In some cases, if the probability of a match is greater than a predetermined threshold level, it may be determined that the feature in the two images may be a match. In some cases, feature matching algorithms of this type, performed by the processors 500, may include determining a correlation and/ or a cross correlation of a variety of parameters associated with the images, or portions thereof, such as the cluster of pixels that may be compared in the first image and the second image. Example parameters that may be compared across images may include pixel color(s), intensity, brightness, or the like. It will be appreciated that while the localization system and mechanism is described with reference to two images, the systems and the algorithms may be extended to any number of received images that are to be compared and localized. It will further be appreciated that the processors 500 may perform a variety of mathematical and/or statistical algorithms to identify and/or "recognize" features that appear across more than one image. The mathematical and/or statistical algorithms may involve a variety of suitable techniques, such as iterative comparisons of image pixels, or portions thereof, and/or a variety of filtering techniques to isolate particular pixels of an image, such as threshold filtering.

The image module may, in another aspect, may further include instructions that, when executed by the processors 500 enable the mapping server 210 to perform a variety of image processing techniques that may enable stitching received images to develop an appropriate model and/or map of the structure to be mapped. These image processing algorithms may be performed in cooperation with processes enabled by the instructions of the SLAM module 522. Example image processing techniques may include, but are not limited to, scaling an image, skewing the image, deskewing the image, sharpening at least a portion of the image, dimming, brightening, and/or modifying the contrast and/or color of pixels of the image, dithering pixels, or combinations thereof.

The sensor data module 518 may have instructions stored therein that may be executed by the processors 500 to receive and analyze various sensor data from one or more user devices 120. The incoming information, in some example embodiments, may include feature location information, such as from mm-wave sensors of the user device 120. In the same or other example embodiments, the sensor data, as received from one or more user devices 120, may include information related to the distance of a feature and/or structure for which an image is generated. This sensor data may include, for example, one or more of RADAR, LIDAR, and/or SONAR data. In yet further example embodiments, location information may be received by the mapping servers 210 and the processors 500 thereon from one or more user devices 120. Such location information, in certain example cases, may be absolute location information, such as particular latitude, longitude, and/or altitude of the user device 120, such as information that may be determined form GNSS signals and/or inertial sensors, such as accelerometers. In other example cases, the received location information may be relative location information, such as a change in location from the last location provided. Therefore, a time series of location information may be received, where a particular location may be relative to one or more preceding locations of the user device 120. In some example embodiments, the location information provided may correspond to one or more phase and/or change in phase information provided to the mapping servers 210 and the processors 500 thereon from one or more of the user devices 120, the communications infrastructure 230, and/or the communications servers 340.

The IQ data module 520 may have instructions stored therein that may be executed by the processors 500 to perform various functions related to analyzing IQ data or phase data of communications signals to enhance the models and/or mapping of structures. The phase information received by the mapping servers 210 may be any one or more of as-transmitted phase of the communications signals, as-received phase of the communications signals, and/or a change in phase between the as-transmitted and as-received communications signals. This phase information of the communications signals may be received from either or both of the user device 120 and/or the communications infrastructure 230 or associated communications servers. As described above, the as-transmitted phase information, in certain example embodiments, may be encoded onto the communications signal when transmitted by the transmitting entity (user device 120 or the communications infrastructure 230). The as-received phase information may be determined at the receiving entity (user device 120 or the communications infrastructure 230), such as by usual techniques for achieving demodulation coherency, such as applying the as-received signal to a PLL. As described in reference to FIG. 4 and the user device 120, the phase information received by the mapping server 210, in example embodiments, may be a time series of phase information. In some cases, this phase information may be received with corresponding location information of the user device 120. It will be appreciated that in certain example embodiments, the user device 120 may be in relative proximity of the communications infrastructure 230 to provide suitable fidelity and resolution in imaging of features 140, 142, 144, 146, 148, 150, including hidden features 160, 162 of the structure 100. In the same or other cases, phase information may be received from more than one user device 120 that is located in proximity of a structure that is to be mapped and/or modeled. The received phase information from multiple locations (either from a plurality of time sample of a single user device 120 or from a plurality of user devices 120) may be used by the mapping servers to determine a change in path length from one sampling location to another. The path length may be a function of both the distance between the communications signal receiving entity 120, 230 and the communications signal transmitting entity 230, 120, as well as the characteristics of materials that the communications signal passes through. Therefore, if the path length can be derived from the received phase information at a plurality of locations in proximity of the structure to be imaged, then features through which the communications signal passes may be imaged. This mechanism may be performed by the processors 500 to detect and identify hidden features associated with the structure.

It will further be appreciated that in certain example embodiments, the processors 500 mapping servers 210, may be configured to operate as an active or passive imager that is configured to determine the in-phase and quadrature phase components of the communications signal using a mixing approach. In a non-limiting example, two double balanced mixers may be utilized to provide and/or determine IQ information of transmitted/received communications signals for the purposes of imaging, such as imaging of the hidden features 160, 162. In this case, both amplitude and phase of the communications signals may be received from down-converted in-phase and quadrature components of the communications signals. This information may be used for the purposes of imaging features 140, 142, 144, 146, 148, 150 of the structure 100.

The SLAM module 522 may have instructions stored therein that, when executed by the processors 500, configure the mapping servers to perform a simultaneous localization and mapping process that is optionally enhanced with sensor data and IQ data. The processors may perform a localization process by identifying features as a grouping of constituent pixels of an image across a plurality of images and determine if there is any commonality in the identified features. The features and the corresponding pixels of the images may be identified by any suitable mechanism, such as filtering mechanisms. Features identified across images may provide the processors 500 the ability to process and merge the images where the common feature is identified. For example, a couch within a house may be identified by the processors 500 in two different images received by the mapping servers 210 and the processors 500 thereon. The processors 500 may use the couch to scale or deskew or perform a sharpening algorithm to one or both images to be able to merge the information of the two images. If the images are spatially not completely overlapping with each other, then the combination of the two images may provide a more comprehensive model of the structure to be mapped than either of the images alone. The processors 500 therefore, by executing the instructions stored in the SLAM module 522, may be configured to process a plurality of images received from a variety of sources and user device 120 by the mapping server to generate a map and or model of the structure. In other words, in certain example embodiments, the images for performing the SLAM process may be crowd sourced. In some cases, the mapping server 210 and/or entities that control the mapping servers 210 may provide incentives, such as monetary compensation, to those users 110 that may provide images to enable the mapping servers 210 to construct maps of particular structures.

The SLAM module 522 may further have instructions, that when executed by the processors 500, may configure the processors 500 to identify features within a particular image, such as a corner, a door in a wall, a window, or the like. This type of identification where a two-dimensional image is used to a develop a relatively complex model in three-dimensions, while intuitive for a human mind, may be computationally intensive for a computer. Accordingly, the mapping servers 210 and the processors 500 thereon may employ a variety of image analysis techniques, such as filtering techniques, to identify corners, openings in the walls, and the like in the images received by the mapping servers 210. In example embodiments, the mapping servers 210 may generate a three-dimensional models of the structure that may then be used to render portions of the structure as any variety of maps, such as a layout, profile, or any slice of a cross-section of the structure.

The SLAM module 522 may further have instructions, that when executed by the processors 500, may configure the processors 500 to provide maps of a particular structure to a requester of the maps. A requester may be a user 110 of a user device 120 and may request the map from his/her user device 120. In some example embodiments, distribution of the maps of particular structures may be restricted to approved individuals and the restrictions may be enforced via any suitable mechanism, such as user authentication on the mapping servers 210. In some cases, It will be appreciated that there may be overlap in the functionality of the instructions stored in the operating systems (O/S) module 312, the applications module 514, the image module 516, the sensor data module 518, the IQ data module 520, and/or the SLAM module 522. In fact, the functions of the aforementioned modules 512, 514, 516, 518, 520, 522 may interact and cooperate seamlessly under the framework of the mapping servers 210. Indeed, each of the functions described for any of the modules 512, 514, 516, 518, 520, 522 may be stored in any module 512, 514, 516, 518, 520, 522 in accordance with certain embodiments of the disclosure. Further, in certain embodiments, there may be one single module that includes the instructions, programs, and/or applications described within the operating systems (O/S) module 512, the applications module 514, the image module 516, the sensor data module 518, the IQ data module 520, and/or the SLAM module 522.

Figure 6:
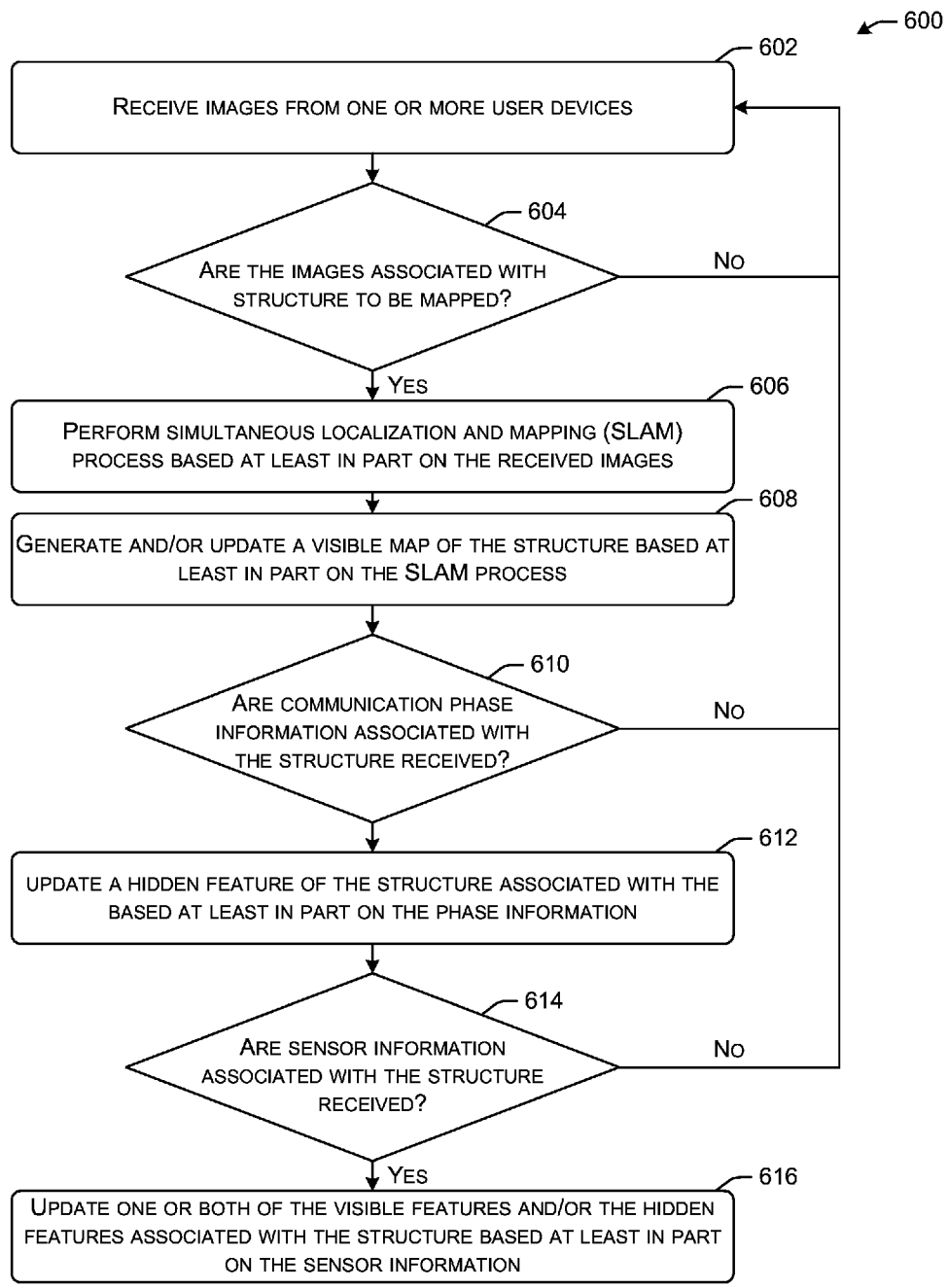
FIG. 6 is a flow diagram illustrating an example method for providing maps based on images received by one or more mapping servers, in accordance with certain example embodiments of the disclosure.

FIG. 6 is a flow diagram illustrating an example method 600 for providing maps based on images received by one or more mapping servers, in accordance with certain example embodiments of the disclosure. This method 600 may be performed by the mapping servers 210 and the processors 500 thereon.

At block 602, images may be received by the mapping servers from one or more user devices. As described above the images, in some cases may be received from a single user device 120 and in other cases may be received from a plurality of user devices 120. Regardless of whether the images are from one or many user devices 120, the images may be from a variety of locations in relative proximity of the structure to be mapped.

At block 604, it may be determined if the received images are associated with a structure or location to be mapped. This type of localization process, as described above, may entail isolating and analyzing pixels and/or subsets of pixels of the received images to identify common features of the structure across more than one image. If a known/common feature is identified within the received images, then it may be decided that at least one of the received images is associated with the structure to be mapped.

If at block 604, it is determined that the images are associated with the structure to be mapped then, at block 606, a simultaneous localization and mapping (SLAM) process may be performed, based at least in part on the received images at block 602. The SLAM process, as described above may further entail one or more of localization processes, image processing based at least in part on identification of common feature(s) across received images, merging of images, further identification of features within the merged images. At block 608, a map of the structure may be generated and/or updated based at least in part on the SLAM process of block 606. This map, upon construction or update, may be stored by the processors 500 in the memory 510 of the mapping servers 210. Indeed, the map may be a model of the structure that includes one or more digital files that represent the structure. In some example embodiments, the map may be one or more merged images of the structure. In the same or other example embodiments, the map may include identification and properties of features of the structure. As a non-limiting example, the map may include an identification of a door (feature) within a room (structure) and may further identify the dimensions of the door within the room.

At block 610, it may be determined if any communications phase information associated with the structure is received. If no communications phase information is received from the user device 120, the communications infrastructure 230 or the communications servers 340, then the method may return to block 602 to await receipt of additional images.

If however, at block 610 it is determined that communications signal phase information has been received by the mapping servers 210, then at block 612, a hidden feature of the structure may be updated based at least in part on the phase information. This phase information, as described above, in certain example embodiments, may include a time series of phase information or phase information from a plurality of user devices 120. By having a spatial spread in the origination of the phase information, the mapping servers 210 may determine the locations of objects through which the communications signals travel and may be able to identify discontinuities in those objects and/or features. For example, the phase difference of an as-transmitted communications signal and an as-received communications signal between the user device 120 and the communications infrastructure 230 may vary as the communications signal passes through materials of different density, thickness, or moistness. This variation may be identified and utilized by the mapping servers 210 to determine the materials and seams between materials through which the communications signal travels to/from the user device 120 and from/to the communications infrastructure 230. In some example embodiments, predefined models of common features, such as walls and/or pipes, may be provided to which the phase information may be fit to identify the features of the structures.

At block 614, it may be determined if sensor information associated with the structure has been received. It may be determined that received sensor information is associated with a particular structure if the sensor information is received at relatively the same time as an image from a particular user device 120. In some example cases, the sensor data may be tagged with the received images. For example, in some cases, the images may be received sensor information related to range or distance from the user device 120 of the features that are sensed. If sensor information has not been received, then the method 600 may return to block 602 and await receiving further images.

If however at block 614, sensor information associated with the structure is received, then the method may proceed to block 616 where visible features and/or hidden features of the map may be updated based at least in part on the received sensor information. The sensor data, as described above may provide a variety of information that may be used to identify either or both of hidden features and/or visible features of the structure. For example, mm-wave sensors may provide information about hidden features, such as wall studs, pipes, and/or electrical conduits hidden within drywall of a structure. RADAR, SONAR, and/or LIDAR may provide accurate ranging information of visible and/or hidden features that may be used for enhancing the generated maps.

It should be noted, that the method 600 may be modified in various ways in accordance with certain embodiments of the disclosure. For example, one or more operations of method 600 may be eliminated or executed out of order in other embodiments of the disclosure. Additionally, other operations may be added to method 600 in accordance with other embodiments of the disclosure.

Figure 7:
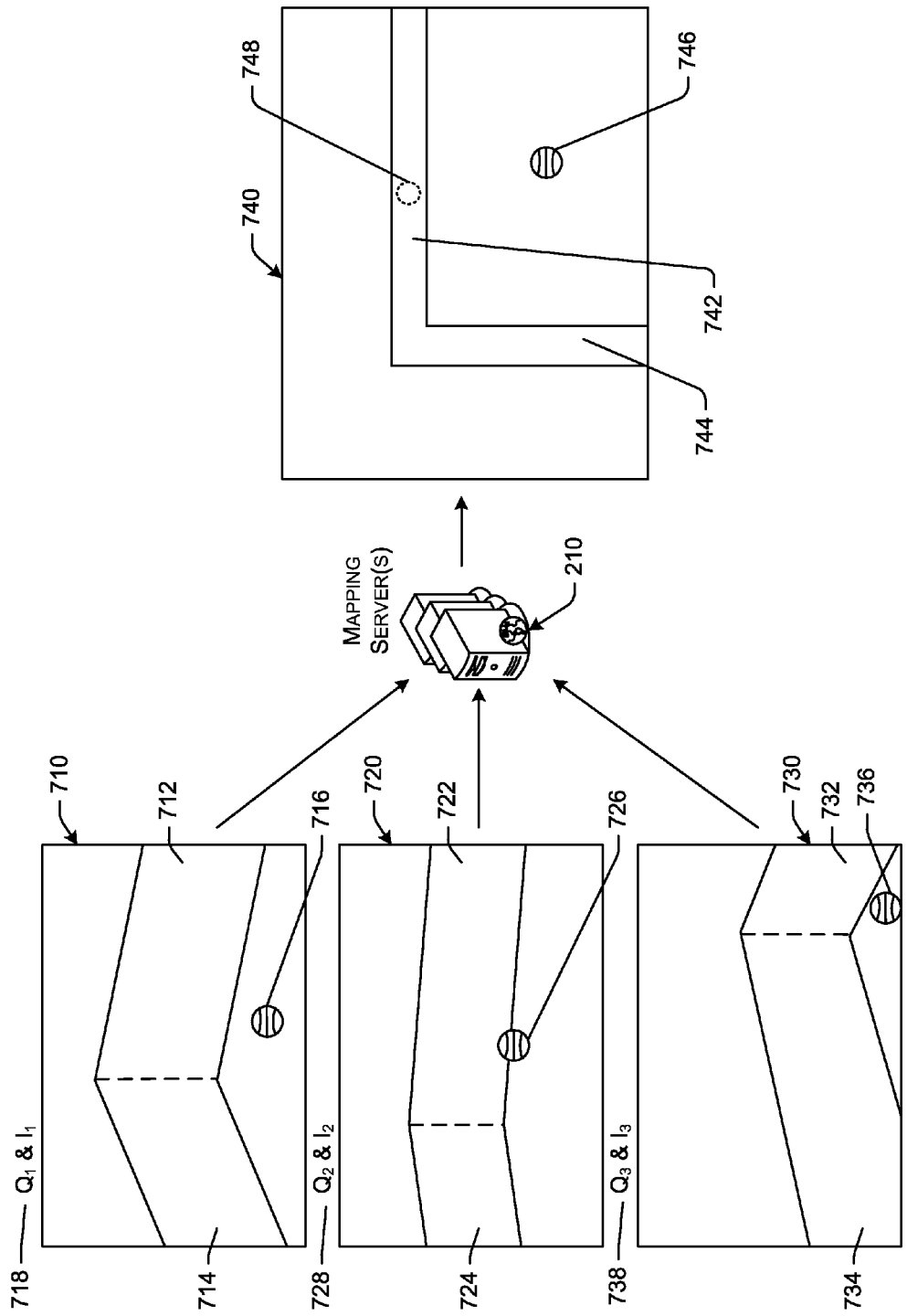
FIG. 7 is a schematic diagram illustrating an example construction of a map based on received images and phase information by a mapping server, in accordance with certain example embodiments of the disclosure.

FIG. 7 is a schematic diagram illustrating an example construction of a map 740 based on received images 710, 720, 730 and phase information 718, 728, 738 by the mapping server 210, in accordance with certain example embodiments of the disclosure. In one aspect, the mapping server 210 may receive a first image 710, a second image 720, and a third image 730. These images 710, 720, 730 may be received from a single user device 120 and associated user 110 or from more than one user device 120 and associated users 110. It will be appreciated that by receiving images 710, 720, 730, systems and methods discussed herein may enable crowd sourcing of information used to generate the maps 740.

Additionally, communications signal phase information 718, 728, 728 may be received by the mapping servers 210 along with the images 710, 720, 730, respectively. This communications signal phase information may be received from either or both of the user device(s) 120 and/or the communications infrastructure. In certain example embodiments, the communications phase information may be tagged with an identification of an image with which it correspond. The tagging may enable the mapping servers 210 to determine the association of the communications phase information with the image and/or a location associated with the image, as determined by the mapping servers 210. In some example cases, the phase information 718, 728, 738 may be a time series of phase information that may be used for determining a change of location versus a change in phase from one time step to another to ascertain information about features through which the communications phase travels.

As depicted, the mapping server 210 may be able to identify features 712, 714, 716 image 710, features 722, 724, 726 within image 720, and features 732, 734, 736 within image 730. The identification of the features 712, 714, 716, 722, 724, 726, 732, 734, 736 in the images 710, 720, 730 may be performed by filtering processes, such as processes that identify and filter based on a contrast change between proximal pixels of each of the images 710, 720, 730. Based at least in part on the identification of the various features 712, 714, 716, 722, 724, 726, 732, 734, 736 in the images 710, 720, 730, the processors 500 may further identify that the features 712, 722 and 732 are the same feature, that the features 714, 724, and 734 are the same feature, and that the features 716, 726, and 736 are the same feature. At this point, the processors 500 may be able to process and/or manipulate each of the images 710, 720, 730 by recognizing the common features across the various images. These manipulations and/or processing of the images 710, 720, 730 may be to enable the use of the images 710, 720, 730 for building a map and/or model of the structure, even though the images may not be of completely overlapping regions, taken from the same angles or perspectives, may have different resolutions, pixel counts, and/or size, or a variety of other imaging parameters that may be different between the various images 710, 720, 730. Upon processing of the images 710, 720, 730, the mapping servers 210 may combine the images 710, 720, 730 and the features 712, 714, 716, 722, 724, 726, 732, 734, 736 therein to generate the map 740 depicting the feature 742 corresponding to features 712, 722, 732 in images 710, 720, 730, respectively, the feature 744 corresponding to features 714, 724, 734 in images 710, 720, 730, respectively, and the feature 746 corresponding to features 716, 726, 736 in images 710, 720, 730, respectively. The map 740 may also include a hidden feature 748 that may be determined form the received phase information 718, 728, 738.

Embodiments described herein may be implemented using hardware, software, and/or firmware, for example, to perform the methods and/or operations described herein. Certain embodiments described herein may be provided as one or more tangible machine-readable media storing machine-executable instructions that, if executed by a machine, cause the machine to perform the methods and/or operations described herein. The tangible machine-readable media may include, but is not limited to, any type of disk including floppy disks, optical disks, compact disk read-only memories (CD-ROMs), compact disk rewritable (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of tangible media suitable for storing electronic instructions. The machine may include any suitable processing or computing platform, device or system and may be implemented using any suitable combination of hardware and/or software. The instructions may include any suitable type of code and may be implemented using any suitable programming language. In other embodiments, machine-executable instructions for performing the methods and/or operations described herein may be embodied in firmware. Additionally, in certain embodiments, a special-purpose computer or a particular machine may be formed in order to identify actuated input elements and process the identifications.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

While certain embodiments of the invention have been described in connection with what is presently considered to be the most practical and various embodiments, it is to be understood that the invention is not to be limited to the disclosed embodiments, but on the contrary, is intended to cover various modifications and equivalent arrangements included within the scope of the claims. Although specific terms are employed herein, they are used in a generic and descriptive sense only, and not for purposes of limitation.

This written description uses examples to disclose certain embodiments of the invention, including the best mode, and also to enable any person skilled in the art to practice certain embodiments of the invention, including making and using any devices or systems and performing any incorporated methods. The patentable scope of certain embodiments of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Example embodiments of the disclosure may include a method that may include receiving, by a mapping server comprising one or more processors, a plurality of images from at least one user device; analyzing, by the mapping server, the plurality of images; determining, by the mapping server and based at least in part on the analyzing, that the images are associated with a structure; and generating, by the mapping server, a map of the structure based at least in part on the plurality of images.

Further example embodiments may include the method, wherein the plurality of images include image information of at least one feature of the structure. Further still, analyzing the plurality of images comprises identifying the at least one feature of the structure in the each of the plurality of images. Generating the map of the structure may further comprises manipulating, by the mapping servers, each of the plurality of images to generate a plurality of manipulated images and combining, by the mapping servers, the manipulated images. Yet further embodiments may include the method, further comprising receiving, by the mapping servers, communications phase information; determining, by the mapping servers, a location of at least one hidden feature associated with the structure based at least in part on the communications phase information; and updating, by the mapping servers, the map based at least in part on the location of the at least one hidden feature. The hidden feature may include a feature behind a wall of the structure. The methods may further comprise receiving, by the mapping servers, one or more sensor information associated with the structure; and updating, by the mapping server, the map based at least in part on the one or more sensor information. The map comprises at least one of: (i) a layout of the structure; (ii) a profile of the structure; or (iii) a cross-section of the structure.

Still further example embodiments of the disclosure may include one or more computer-readable media comprising computer-executable instructions that, when executed by one or more processors, configure the one or more processors to perform a method comprising receiving a plurality of images from a plurality of user devices; analyzing the plurality of images; determining, based at least in part on the analyzing, that the images are associated with a structure; and generating a map of the structure based at least in part on the plurality of images.

Yet further example embodiments may include the one or more computer-readable media, wherein the plurality of images include image information of at least one feature of the structure. Analyzing the plurality of images comprises identifying the at least one feature of the structure in the each of the plurality of images. In further example embodiments, may include the one or more computer-readable media, wherein the generating the map of the structure comprises manipulating each of the plurality of images to generate a plurality of manipulated images; and combining the manipulated images. The one or more computer-readable media, where the method further comprises receiving communications phase information; determining a location of at least one hidden feature associated with the structure based at least in part on the communications phase information; and updating the map based at least in part on the location of the at least one hidden feature. In some example embodiments, the at least one hidden feature includes a feature behind a wall of the structure. The one or more computer-readable media where the method further comprises receiving one or more sensor information associated with the structure; and updating the map based at least in part on the one or more sensor information. The one or more computer-readable media, wherein the map comprises at least one of: (i) a layout of the structure; (ii) a profile of the structure; or (iii) a cross-section of the structure.

Further example embodiments of the disclosure may include a system, comprising at least one memory that stores computer-executable instructions and at least one processor configured to access the at least one memory, wherein the at least one processor is configured to execute the computer-executable instructions to receive a plurality of images from a plurality of user devices; analyze the plurality of images; determine, based at least in part on the analyzing, that the images are associated with a structure; and generate a map of the structure based at least in part on the plurality of images.

Example embodiments may further include the system wherein the plurality of images include image information of at least one feature of the structure. Further still, embodiments of the disclosure may include the system where the at least one processor is configured to execute the computer-executable instructions to analyze the plurality of images comprises the at least one processor is configured to execute the computer-executable instructions to identify the at least one feature of the structure in the each of the plurality of images. The system, according to example embodiments, wherein the at least one processor is configured to execute the computer-executable instructions to generate the map of the structure comprises the at least one processor is configured to execute the computer-executable instructions to manipulate each of the plurality of images to generate a plurality of manipulated images; and combine the manipulated images. The system, may further include the at least one processor is further configured to execute the computer-executable instructions to receive communications phase information; determining a location of at least one hidden feature associated with the structure based at least in part on the communications phase information; and updating the map based at least in part on the location of the at least one hidden feature.

Example embodiments of the disclosure may further include an apparatus for mapping, comprising a means for receiving a plurality of images from a plurality of user devices; a means for analyzing the plurality of images; a means for determining, based at least in part on the analyzing, that the images are associated with a structure; and a means for generating a map of the structure based at least in part on the plurality of images. In the apparatus, the plurality of images include image information of at least one feature of the structure. Analyzing the plurality of images, in example embodiments, comprises identifying the at least one feature of the structure in the each of the plurality of images. In further example embodiments, the apparatus further includes a means for manipulating each of the plurality of images to generate a plurality of manipulated images; and a means for combining the manipulated images. The apparatus may yet further include a means for receiving communications phase information; a means for determining a location of at least one hidden feature associated with the structure based at least in part on the communications phase information; and a means for updating the map based at least in part on the location of the at least one hidden feature. The at least one hidden feature includes a feature behind a wall of the structure. According to example embodiments, the apparatus comprises a means for receiving one or more sensor information associated with the structure; and a means for updating the map based at least in part on the one or more sensor information. The map comprises at least one of: (i) a layout of the structure; (ii) a profile of the structure; or (iii) a cross-section of the structure.

The claimed invention is:

1. A method, comprising:
receiving, by a mapping server comprising one or more processors, a plurality of images from a user device;
analyzing, by the mapping server, the plurality of images;
determining, by the mapping server and based at least in part on an analysis of the plurality of images, that the plurality of images is associated with a structure;
generating, by the mapping server, a map of the structure based at least in part on the plurality of images;
receiving, by the mapping server, communications phase information indicating a phase difference associated with a communication signal sent between the user device and a communications infrastructure;
determining, by the mapping server, a location of at least one hidden feature associated with the structure based at least in part on the communications phase information wherein the communications phase information is tagged with an identification of an image of the plurality of images to which the communications phase information corresponds, and
updating, by the mapping server, the map based at least in part on the location of the at least one hidden feature.

2. The method of claim 1, wherein the plurality of images includes image information of at least one feature of the structure, the image information comprising spectral information of at least one of visible wavelengths, infrared wavelengths, or near-ultraviolet wavelengths.

3. The method of claim 2, wherein analyzing the plurality of images comprises identifying the at least one feature of the structure in the each of the plurality of images.

4. The method of claim 1, wherein the generating the map of the structure comprises:
manipulating, by the mapping servers, each of the plurality of images to generate a plurality of manipulated images; and combining, by the mapping servers, the manipulated images.

5. The method of claim 1, wherein the at least one hidden feature includes a feature behind a wall of the structure.

6. The method of claim 1, further comprising:
receiving, by the mapping servers, one or more sensor information associated with the structure; and
updating, by the mapping server, the map based at least in part on the one or more sensor information.

7. The method of claim 1, wherein the map comprises at least one of: (i) a layout of the structure; (ii) a profile of the structure; or (iii) a cross-section of the structure.

8. The method of claim 1, further comprising receiving, by the mapping server, the communications phase information from the communications infrastructure via a network.

9. One or more non-transitory computer-readable media comprising computer-executable instructions that, when executed by one or more processors, configure the one or more processors to perform a method comprising:
receiving a plurality of images from a user device;
analyzing the plurality of images;
determining, based at least in part on an analysis of the plurality of images, that the plurality of images is associated with a structure;
generating a map of the structure based at least in part on the plurality of images;
receiving communications phase information indicating a phase difference associated with a communication signal sent between the user device and a communications infrastructure;
determining a location of at least one hidden feature associated with the structure based at least in part on the communications phase information wherein the communications phase information is tagged with an identification of an image of the plurality of images to which the communications phase information corresponds, and updating the map based at least in part on the location of the at least one hidden feature.

10. The one or more non-transitory computer-readable media of claim 9, wherein the plurality of images includes image information of at least one feature of the structure, the image information comprising spectral information of at least one of visible wavelengths, infrared wavelengths, or near-ultraviolet wavelengths.

11. The one or more non-transitory computer-readable media of claim 10, wherein analyzing the plurality of images comprises identifying the at least one feature of the structure in the each of the plurality of images.

12. The one or more non-transitory computer-readable media of claim 9, wherein the generating the map of the structure comprises:
manipulating each of the plurality of images to generate a plurality of manipulated images; and
combining manipulated images.

13. The one or more non-transitory computer-readable media of claim 9, wherein the at least one hidden feature includes a feature behind a wall of the structure.

14. The one or more non-transitory computer-readable media of claim 9, wherein the method further comprises:
receiving one or more sensor information associated with the structure; and
updating the map based at least in part on the one or more sensor information.

15. The one or more non-transitory computer readable media of claim 9, wherein the map comprises at least one of: (i) a layout of the structure; (ii) a profile of the structure; or (iii) a cross-section of the structure.

16. A system, comprising:
at least one memory that stores computer-executable instructions;
at least one processor configured to access the at least one memory, wherein the at least one processor is configured to execute the computer-executable instructions to:
receive a plurality of images from a user device;
analyze the plurality of images;
determine, based at least in part on an analysis, that the plurality of images is associated with a structure;
generate a map of the structure based at least in part on the plurality of images
receive communications phase information indicating a phase difference associated with a communication signal sent between the user device and a communications infrastructure;
determine a location of at least one hidden feature associated with the structure based at least in part on the communications phase information, wherein the communications phase information is tagged with an identification of an image of the plurality of images to which the communications phase information corresponds, and
update the map based at least in part on the location of the at least one hidden feature.

17. The system of claim 16, wherein the plurality of images includes image information of at least one feature of the structure, the image information comprising spectral information of at least one of visible wavelengths, infrared wavelengths, or near-ultraviolet wavelengths.

18. The system of claim 17, wherein the computer-executable instructions that cause the at least one processor to analyze the plurality of images, further comprises computer-executable instructions to cause the at least one processor to identify the at least one feature of the structure in each of the plurality of images.

19. The system of claim 16, wherein the at least one processor is configured to execute the computer-executable instructions to generate the map of the structure comprises the at least one processor is configured to execute the computer-executable instructions to:
manipulate each of the plurality of images to generate a plurality of manipulated images; and combine the manipulated images.

20. The system of claim 16, wherein the at least one hidden feature includes a feature behind a wall of the structure.

21. The system of claim 16, wherein the at least one processor is further configured to execute the computer-executable instructions to:
receive one or more sensor information associated with the structure; and
update the map based at least in part on the one or more sensor information.

22. The system of claim 16, wherein the map comprises at least one of: (i) a layout of the structure; (ii) a profile of the structure; or (iii) a cross-section of the structure.

* * * * *